Patented Feb. 21, 1928.

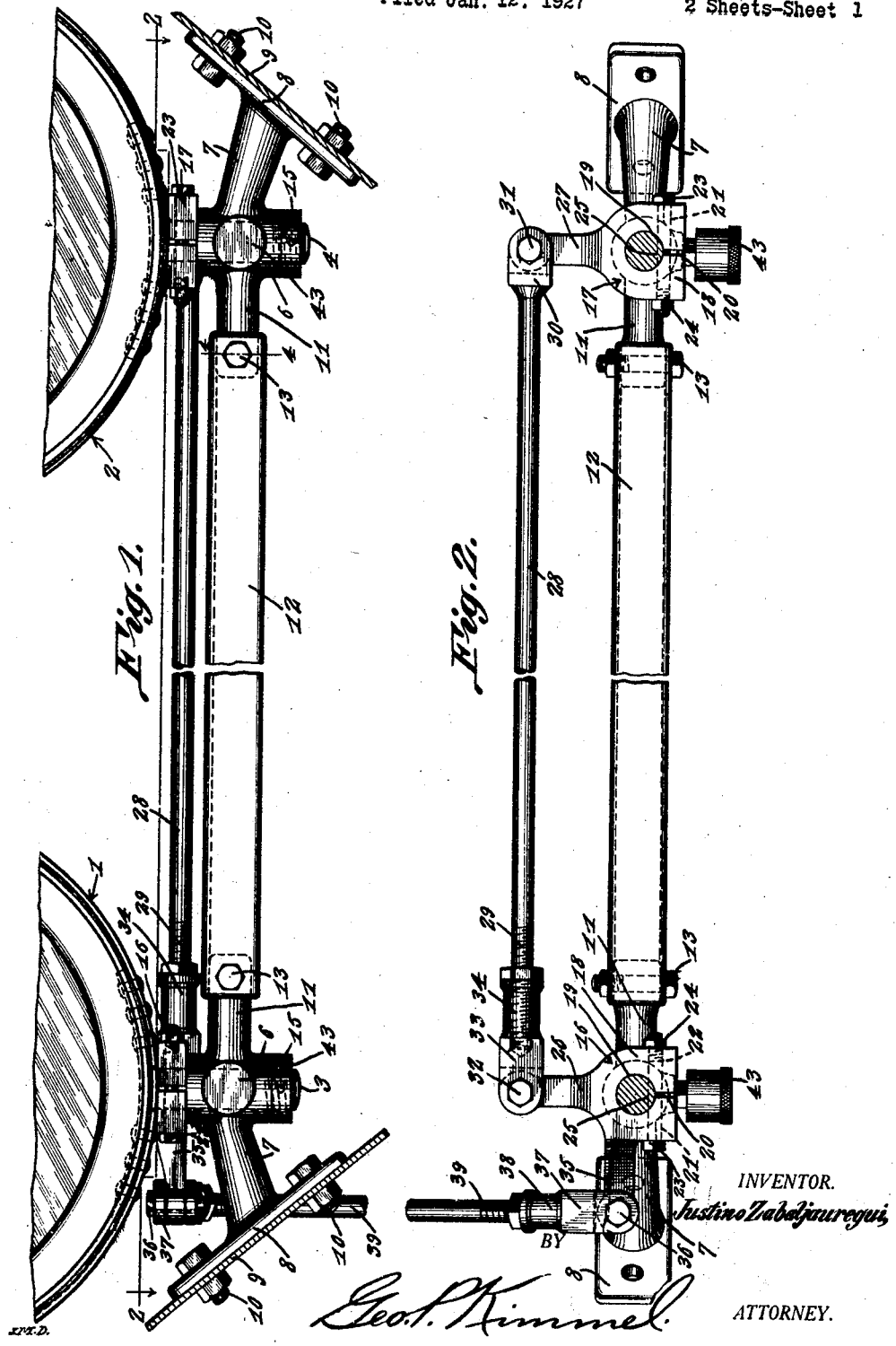

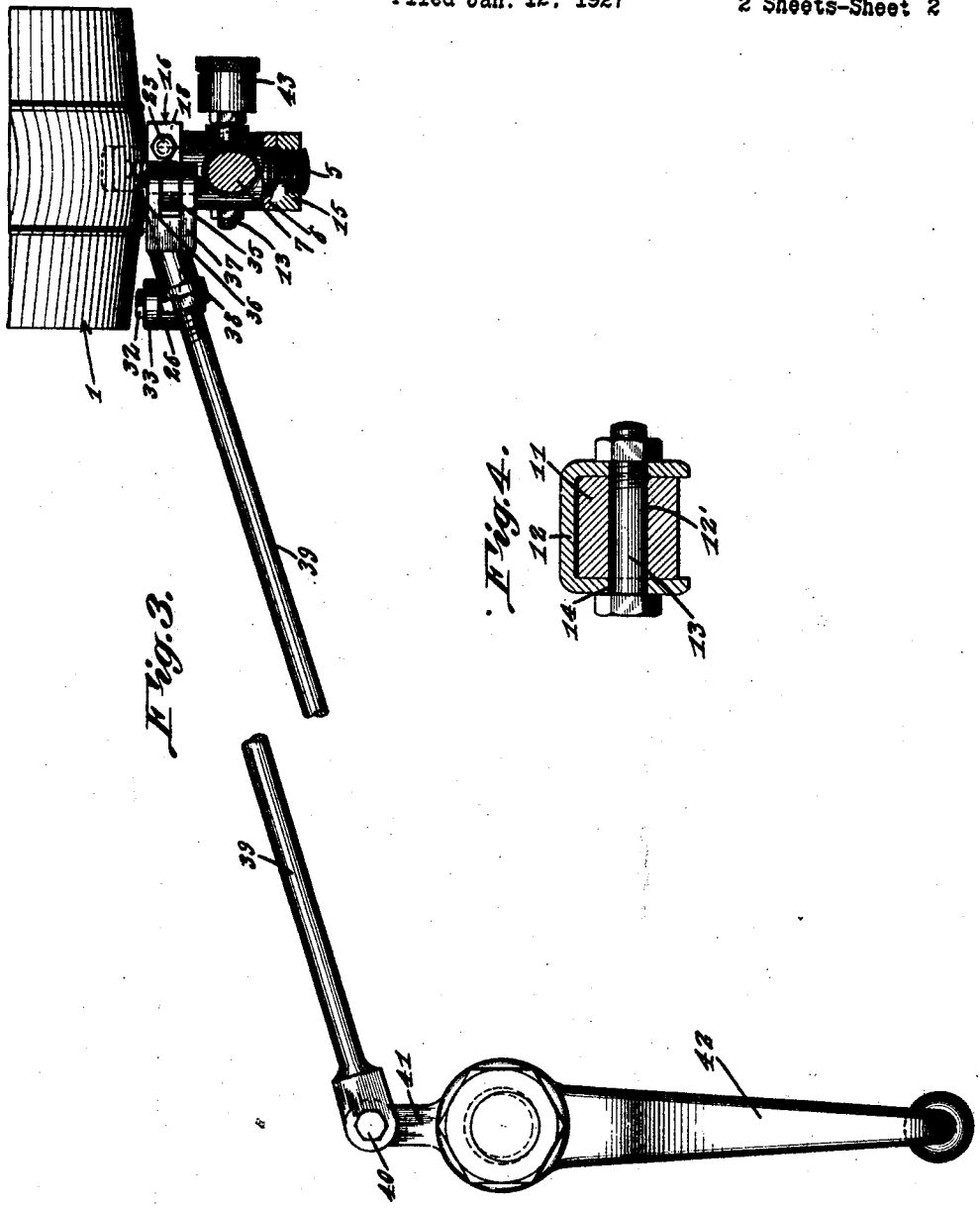

1,660,288

UNITED STATES PATENT OFFICE.

JUSTINO ZABALJAÚREGUI, OF LA CARLOTA, OCCIDENTAL NEGROS, PHILIPPINE ISLANDS.

SHIFTING MECHANISM FOR HEADLIGHTS.

Application filed January 12, 1927. Serial No. 160,647.

This invention relates to a shifting mechanism for the head lights of a motor vehicle, and has for its object to provide, in a manner as hereinafter set forth, a mechanism of such class, operated from the steering gear of the vehicle for automatically positioning the headlights in the direction of travel when steering the vehicle from straight-away to left or from straight-away to right, or from right to left, or from left to right, whereby the light rays will be projected upon the roadway when the vehicle is turning or rounding corners or when passing around a curve into a straight-away, thereby affording the driver a clear vision of any obstructions ahead or an approaching vehicle, under such conditions providing a safeguard when driving and reducing accidents to a minimum.

Further objects of the invention are to provide, in a manner as hereinafter set forth, a shifting mechanism for the headlights of a motor vehicle, which is simple in its construction and arrangement, strong, durable, compact, automatic in its action, readily installed with respect to the vehicle and steering mechanism of the latter, thoroughly efficient in its use, and comparatively inexpensive to set up.

With the foregoing and other objects in view the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claim hereunto appended.

In the drawings wherein like reference characters denote corresponding parts throughout the several views:

Figure 1 is a fragmentary view, in front elevation, of a headlight shifting mechanism in accordance with this invention.

Figure 2 is a fragmentary view, in plan of the mechanism and taken on line 2—2 Figure 1.

Figure 3 is a fragmentary view, in side elevation and partly in section.

Figure 4 is a section on line 4—4 Figure 1.

Referring to the drawings in detail 1 and 2 generally indicates a pair of headlights and which are provided with posts 3, 4 respectively.

Each post is cylindrical in contour, is revolubly supported and has the lower terminal portion thereof peripherally threaded as indicated at 5, Figure 3. Associated with each post is a support and which also provides a bearing for the post. The supports sustain the headlights in a vertical position. The pair of supports are oppositely disposed with respect to each other and as they are of like construction, but one will be described, as the description of one will apply to the other. Each support consists of a vertically disposed tubular body portion 6, of less height than the height of a post, and the latter extends through said body portion, as well as projects thereabove. Formed integral with the outer side of the body portion 6 is a downwardly inclined arm 7, which terminates at its outer end in a rectangular apertured plate 8, positioned against the inner face of a front fender 9. The plate 8 is fixedly secured to the fender 9 by holdfast devices 10. The holdfast devices 10 are of a type to permit of the plate 8 being detachably connected from the fender 9 if occasion requires. Formed integral with the inner side of the body portion 6 is a right angularly disposed arm 11, of square cross section, see Figure 4, and provided with a transverse opening 12'. Preferably the arm 11 is of less length than the arm 7. The arms 11 of the supports project towards each other and arranged in alinement. Mounted upon the arms 11 of the supports is an inverted channel shaped bar 12, having each end thereof secured to an arm 11, by a holdfast device 13, extending through the opening 12' and also through openings 14 formed in the bar 12. The bar 12 acts as a connecting element between the supports, as well as a bracing means therefor. Threadedly engaging with the terminal portion of each post, and abutting against the lower edge of the body portion 6, is a holding nut 15 which prevents the post from being pulled from the body portion 6 in an upward direction, and when the headlights are arranged in position, the nuts 15 prevent a vertical shift thereof.

The headlights 1 and 2, are connected together for the purpose of simultaneously shifting them and the means employed for the purpose referred to includes a pair of clamping members 16, 17 and the former is employed in connection with the post 3 and the latter with the post 4. The clamping member 16, as well as the member 17, consists of a plate 18 formed with a circular opening 19 and a slit 20 leading from the forward edge of the plate and terminating in the opening 19. The plate 18 is formed with registering transversely extending openings 21, 22, and the wall of the opening 22 is threaded. The openings 21 and 22 are provided for the passage of a bolt 23, carrying on its inner end a clamping nut 24. The bolt 23 extends through a groove 25 formed in the post above the body portion 6 of the support. The bolt 23, in connection with the nut 24, is employed for tightly clamping the plate 18 to a post whereby when a clamping member is shifted the post will be carried therewith. Each plate 18 is formed with a rearwardly extending arm, and that arm forming a part of the clamping member 16 is indicated at 26 and that arm forming a part of the clamping member 17 is indicated at 27. The arms 26 and 27 are connected together, so that when one of the clamping members 16 is shifted the other clamping member 17 will be carried therewith. For the purpose of connecting the clamping members 16 and 17 together, a bar 28 is employed, having one end peripherally threaded as at 29 and its other end formed with an apertured head 30, which is pivotally connected as at 31, to the arm 27. Pivotally connected to the arm 26, as at 32, is a link 33 formed with an extension 34 provided with a socket having a wall thereof threaded. The threaded terminal portion of the bar 28 engages the threaded wall of the socket formed in the member 34 and by this arrangement the bar 28 can be adjustably connected to the link 33. The outer side of the plate 18 is formed with a laterally disposed arm 35, which is pivotally connected as at 36, to a fork 37, which has projecting therefrom a socket-forming member 38 having secured therein the upper end of an actuating bar 39, pivotally connected as at 40, to a lug 41 carried by the steering gear ball arm 42.

Carried by each body portion 6, as well as communicating therewith is a lubricant cup 43. The threads of the bolt 23 engage with the threads on the wall of the opening 22.

From the foregoing construction and arrangement of parts, it is obvious that when the vehicle is steered to the right or to the left the two headlights will be shifted to the right or to the left, depending in which direction the vehicle is steered, and when the headlights are so shifted, the rays will be projected forwardly with respect to the roadway and enable the operator to have a clear vision of any obstructions ahead or see an approaching vehicle, and therefore it is thought that the many advances of a headlight shifting mechanism, in accordance with this invention, can be readily understood, and although the preferred embodiment of the invention is as illustrated and described, yet it is to be understood that changes in the details of construction can be had which will fall within the scope of the invention as claimed.

What I claim is:

A headlight shifting mechanism for a pair of headlights comprising in combination, a pair of tubular, vertically disposed bearing elements each open at each end, a pair of headlight posts positioned in and extending above and below said elements, clamping devices mounted on the upper ends of said bearing elements, and having the upper portions of said posts fixedly secured thereto, a rearwardly extending arm integral with each of said devices, a laterally extending arm integral with the outer side of one of said devices, means threadedly engaging with the lower ends of said posts and in connection with said devices connecting the posts to said bearing elements, means for connecting said rearwardly extending arms together, each of said bearing elements having its front provided with means for connecting a lubricant cup thereto, a downwardly inclined arm integral with the outer side of each of said bearing elements and terminating at its lower end into an integral apertured plate for connection to the fender of the vehicle, an inwardly extending arm integral with the inner side of each of said members, a bar having its ends overlapping the free ends of said inwardly extending arm, means for connecting said bar to said inwardly extending arm, and means connected to the lateral arm for shifting the said posts simultaneously.

In testimony whereof, I affix my signature hereto.

JUSTINO ZABALJAÚREGUI.